US007845617B2

(12) United States Patent
Cobianchi et al.

(10) Patent No.: US 7,845,617 B2
(45) Date of Patent: Dec. 7, 2010

(54) ELECTROMAGNETIC VALVE FOR THE DOSAGE OF FUEL IN AN INTERNAL COMBUSTION ENGINE

(75) Inventors: Andrea Cobianchi, Bologna (IT); Pasquale Dragone, Bologna (IT); Marco Petrachi, Monopoli (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 524 days.

(21) Appl. No.: 12/040,233

(22) Filed: Feb. 29, 2008

(65) Prior Publication Data

US 2008/0251747 A1 Oct. 16, 2008

(30) Foreign Application Priority Data

Mar. 5, 2007 (EP) .................................. 07425124

(51) Int. Cl.
*F16K 31/02* (2006.01)

(52) U.S. Cl. ................... 251/129.15; 335/297; 335/299

(58) Field of Classification Search ............ 251/129.15; 335/296, 297, 299
See application file for complete search history.

(56) References Cited

U.S. PATENT DOCUMENTS 6,421,519 B1 * 7/2002 Yamashita et al. .......... 399/277
7,114,472 B2 * 10/2006 Kondo ..................... 123/90.17
7,331,565 B2 * 2/2008 Mills et al. ............. 251/129.14
7,472,886 B2 * 1/2009 Shimane et al. ............. 251/305
2002/0130206 A1 9/2002 Kobayashi et al.
2005/0023384 A1 2/2005 Kobayashi

FOREIGN PATENT DOCUMENTS

JP 2000008990 1/2000
WO WO2006010665 2/2006

* cited by examiner

*Primary Examiner*—John K Fristoe, Jr.
(74) *Attorney, Agent, or Firm*—Gottlieb, Rackman & Reisman P.C.

(57) ABSTRACT

An electromagnetic valve for the dosage of fuel in an internal combustion engine; the electromagnetic valve is provided with: a cylindrical tubular valve body; an obturator, which is arranged within the tubular valve body and is mobile between an open position and a closed position; and an electromagnetic actuator to shift the obturator and comprising a coil arranged outside the tubular valve body, a fixed magnetic pole is arranged within the tubular valve body, a mobile keeper arranged within the tubular valve body, mechanically connected to the obturator and is adapted to be magnetically attracted by the magnetic pole when the coil is excited, a tubular magnetic armature arranged outside the tubular valve body around the coil, and a magnetic washer having an annular shape arranged above the coil between the tubular valve body and the tubular magnetic armature to guide the closing of the magnetic flow around the coil.

18 Claims, 6 Drawing Sheets

ELECTROMAGNETIC VALVE FOR THE DOSAGE OF FUEL IN AN INTERNAL COMBUSTION ENGINE

TECHNICAL FIELD

The present invention relates to an electromagnetic valve for the dosage of fuel in an internal combustion engine.

The present invention is advantageously applicable to a slide valve for the control (dosage) of the flow rate of a fuel pump, to which the following description will explicitly refer without however loosing in generality.

BACKGROUND ART

In a modern internal combustion engine of the common-rail type, a high pressure pump receives a fuel flow from a reservoir by means of a low pressure pump and supplies the fuel to a common rail which is hydraulically connected to a plurality of injectors. The pressure of the fuel within the common rail must be constantly controlled as a function of the status of the engine by varying the instantaneous flow rate of the high pressure pump or by always supplying an excess of fuel to the common rail and discharging from the common rail itself the excess fuel by means of a control valve. Generally, the solution of varying the instantaneous flow rate of the high pressure pump is preferred, because it displays an energy efficiency which is definitely higher and does not imply an overheating of the fuel.

A solution of the type set forth in patent application EP1612402A1 has been suggested to vary the instantaneous flow rate of the high pressure pump, the application relating to a high pressure pump comprising a number of pumping elements reciprocatingly actuated through corresponding suction and discharge strokes and in which each pumping element is provided with a corresponding suction valve in communication with a suction conduit supplied by a low pressure pump; a slide valve is arranged on the suction conduit, the slide valve being chopper controlled synchronously with an initial part of the suction step of each pumping element. In other terms, the slide valve is a valve of the open/closed type (on/off type) which is driven by modifying the ratio between the opening and closing intervals to vary the instantaneous flow rate of the high pressure pump. In this manner, the slide pump always displays a wide effective passage section that does not determine a significant loss of local pressure (loss of local load).

In patent application EP06425612.6 a slide valve for the flow rate of a fuel pump has been suggested, which is provided with: a cylindrical tubular valve body, which is closed at the top, displays a cylindrical seat which in its lower portion serves as a conduit for the fuel, and comprises a number of radial through bores to allow the entry of the fuel within the cylindrical seat; a lower disk, which is arranged within the cylindrical tubular valve body below the radial bores and displays a central through bore which defines an outlet opening for the fuel; and a cylindrical obturator, which is coupled to the lower disk and is mobile between an open position, in which the outlet opening is in communication with the radial bores, and a closed position, in which the outlet opening is isolated from the radial bores.

An electromagnetic actuator is provided to shift the obturator from the closed position to the open position against the bias of a spring. The electromagnetic actuator comprises a coil arranged externally around the tubular valve body, a fixed magnetic pole, which is arranged within the tubular valve body, a mobile keeper, which is mechanically connected to the obturator and is adapted to be magnetically attracted by the magnetic pole when the coil is excited, a tubular magnetic armature, which is arranged outside the tubular valve body and comprises an annular seat to house the coil therein, and an annular magnetic washer, which is arranged above the coil to guide the closing of the magnetic flow around the coil itself.

The coil is maintained in position by the tubular magnetic armature and by the washer, which are locked against the tubular valve body by means of an interference driving. However, the interference driving of the tubular magnetic armature occurs in an area of the tubular valve body arranged near the mobile keeper; accordingly, by the effect of the interference driving of the tubular magnetic armature, the tubular valve body could locally be subjected to deformations modifying the stroke of the mobile keeper and thus modifying in an unacceptable manner the performance of the slide valve. Specifically, it has been observed that to carry out the interference driving of the tubular magnetic armature on the tubular valve body it is required to hold the tubular magnetic armature still and axially thrust on the tubular valve body; such an axial thrust on the tubular valve body is especially negative because it may easily determine localised deformations of the tubular body.

The locking of the tubular magnetic armature to the tubular valve body by welding has been suggested in order to attempt to solve the above described drawback; however, the execution of the welding considerably increases the assembly costs of the slide valve and further causes a localised retraction of the material that determines a modification of the stroke of the mobile keeper.

DISCLOSURE OF INVENTION

It is an object of the present invention to provide an electromagnetic valve for the dosage of fuel in an internal combustion engine, such an electromagnetic valve not having the above-described drawbacks and, specifically, being easy and cost-effective to make.

According to the present invention there is provided an electromagnetic valve for the dosage of fuel in an internal combustion engine as claimed in the attached Claims.

BRIEF DESCRIPTION OF THE DRAWINGS

The present invention will now be described with reference to the accompanying drawing, which show a non-limitative embodiment thereof, in which.

PREFERRED EMBODIMENTS OF THE INVENTION

Figure 1:
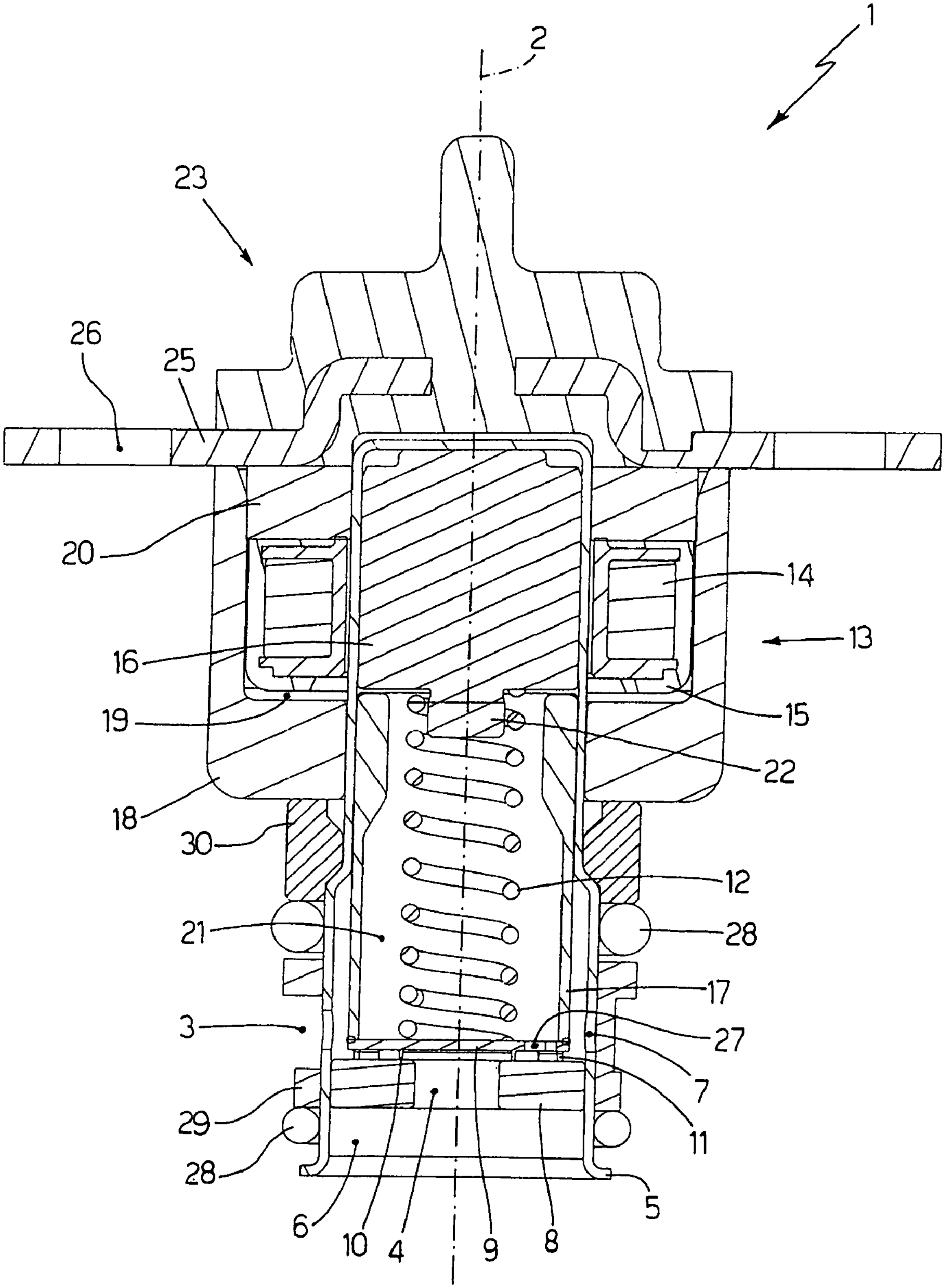
FIG. 1 is a diagrammatic and side section view of an electromagnetic valve made according to the present invention.

In FIG. 1, numeral 1 indicates as a whole an electromagnetic valve for the dosage of fuel in an internal combustion engine. The electromagnetic valve 1 substantially displays a cylindrical symmetry around a longitudinal axis 2, receives the fuel radially (i.e. perpendicularly to the longitudinal axis 2) through an annular chamber 3 and supplies the fuel axially (i.e. coaxially to the longitudinal axis 2) from a lower outlet opening 4.

The electromagnetic valve 1 comprises a cylindrical tubular valve body 5, which is closed at the top, is made by drawing in ferromagnetic steel, and displays a cylindrical seat 6 which in its lower portion serves as a conduit for the fuel. At the annular chamber 3, the tubular valve body 5 comprises a number of through radial bores 7, which serve to allow the entry of the fuel within the cylindrical seat 6.

A lower disk 8 is arranged within the cylindrical seat 6 and below the radial bores 7, the lower disk 8 being laterally welded to the tubular valve body 5 and displays a central through bore which defines the outlet opening 4. To the lower disk 8 there is coupled a cylindrical obturator 9 which is mobile between an open position, in which the outlet opening 4 is in communication with the radial bores 7, and a closed position, in which the outlet opening 4 is isolated from the radial bores 7.

An inner ring 10 having a slightly greater diameter than the outlet opening 4 and an outer ring 11 arranged at the outer edge of the cylindrical obturator 9 protrudingly rise from a lower surface of the cylindrical obturator 9 arranged facing the closing disk 8. The inner ring 10 defines a sealing element, which is adapted to isolate the outlet opening 4 from the radial bores 7 when the obturator 9 is arranged in the closed position resting against the lower disk 8.

The obturator 9 is maintained in the closed position resting against the lower disk 8 by a spring 12 which is compressed between the upper surface of the obturator 9 and an upper wall of the tubular valve body 5. Furthermore, there is provided an electromagnetic actuator 13, which is driven by an electronic control unit (not shown) to shift the obturator 9 from the closed position to the open position against the bias of the spring 12.

The electromagnetic actuator 13 comprises a coil 14, which is arranged externally around the tubular valve body 5 and is enclosed in a plastic material toroidal ratchet 15, a fixed magnetic pole 16, which is made of a ferromagnetic material and is arranged within the tubular valve body 5 at the coil 14, and a mobile keeper 17, which is arranged within the tubular valve body 5, displays a cylindrical tubular shape, is made of ferromagnetic material, is mechanically connected to the obturator 9, and is adapted to be magnetically attracted by the magnetic pole 16 when the coil 14 is excited (i.e. current flows through it). Furthermore, the electromagnetic actuator 13 comprises a tubular magnetic armature 18, which is made of ferromagnetic material, is arranged outside the tubular valve body 5 and comprises an annular seat 19 to house the coil 14 therein, and a magnetic washer 20 having an annular shape, which is made of a ferromagnetic material and is arranged above the coil 14 to guide the closing of the magnetic flow around the coil 14 itself.

The keeper 17 displays a tubular shape and is welded on the lower part to the obturator 9 at the external edge of the obturator 9 itself. Preferably, the spring 12 is arranged through a central through opening 21 of the keeper 17 and is engaged at an upper end thereof by a housing pin 22 which extends from the magnetic pole 16.

Figure 6:
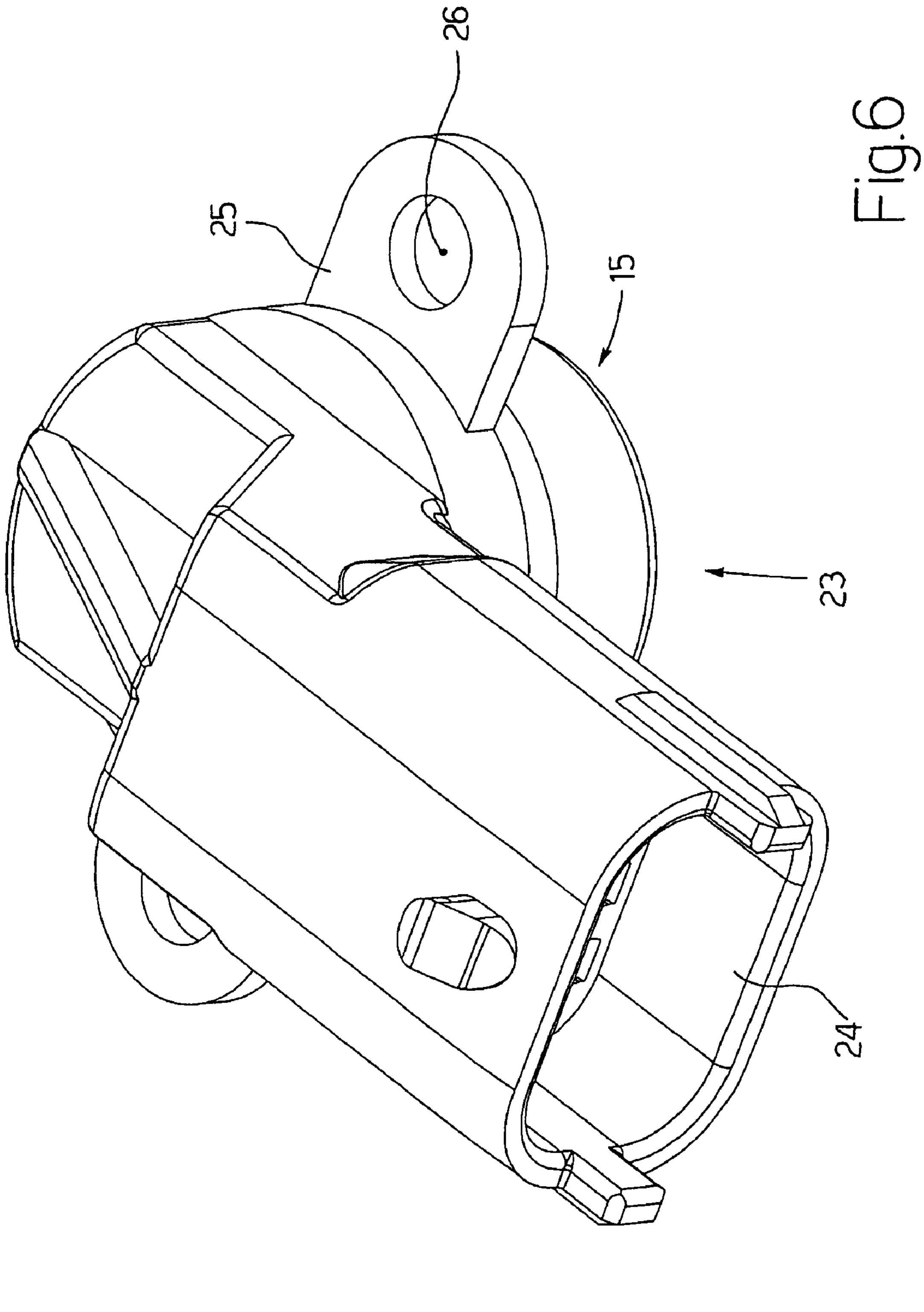
FIG. 6 is a perspective view of a closing body of the electromagnetic valve in FIG. 1.
Figure 7:
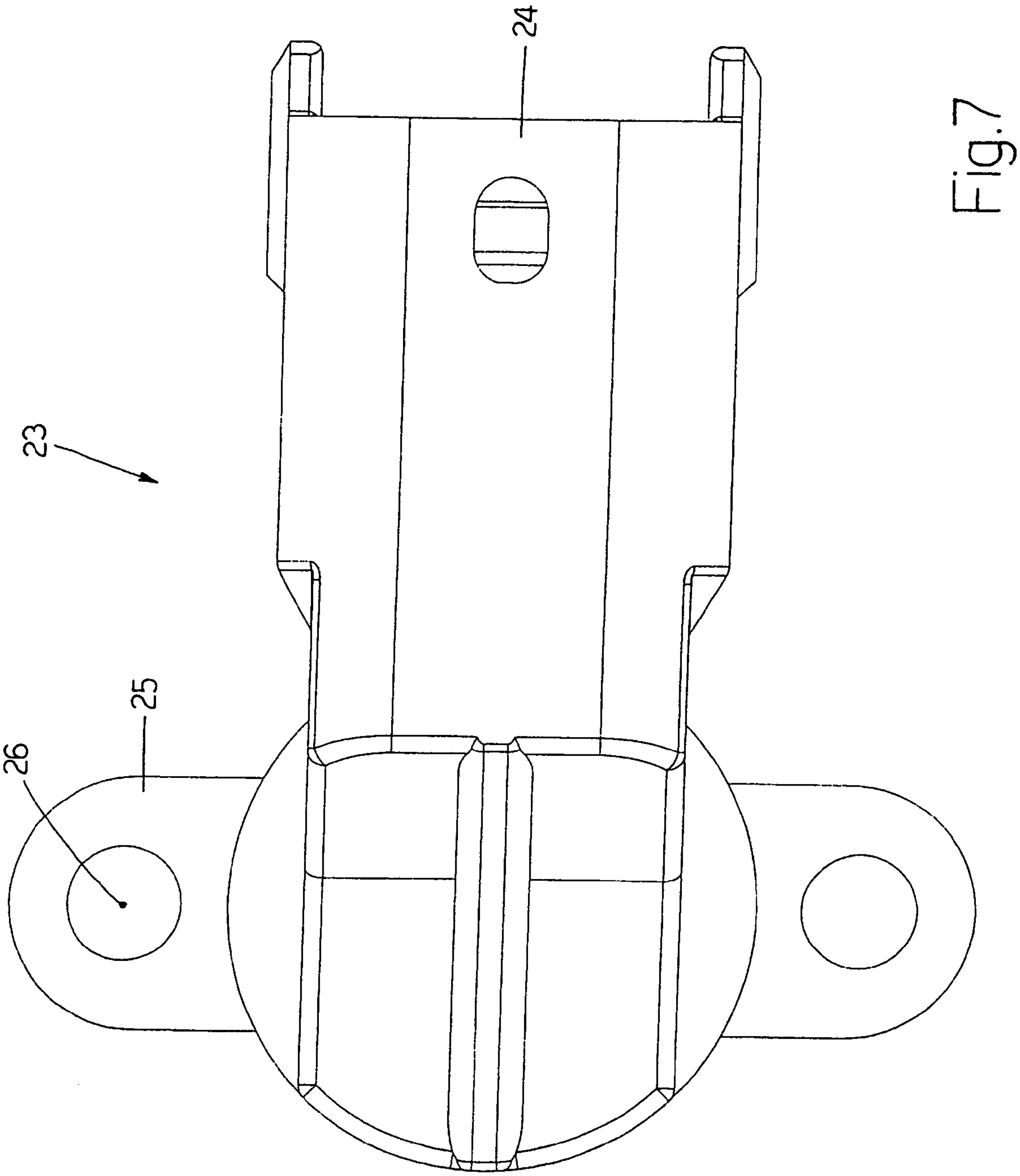
FIG. 7 is a plan view of the closing body in FIG. 6.
Figure 10:
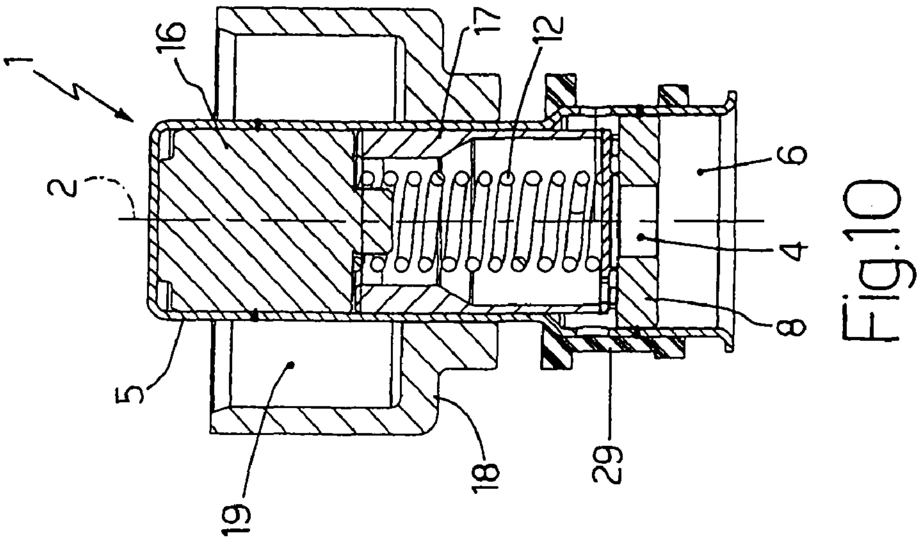
FIGS. 8, 9 and 10 are three side sections of the electromagnetic valve in FIG. 1 during three consecutive assembly steps.
Figure 9:
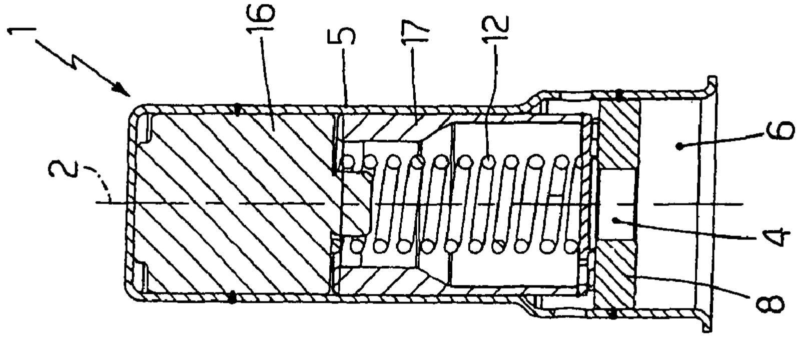
Figure 8:
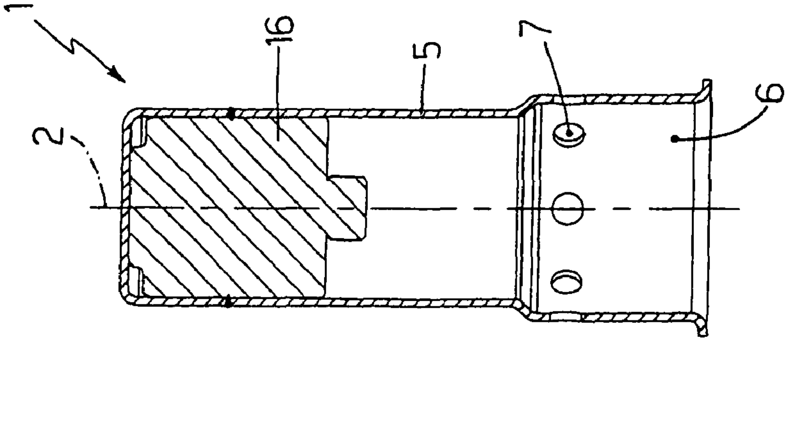

A closing body 23 (shown in greater detail in FIGS. 6 and 7) is provided, which is arranged in contact with the magnetic armature 18 and supports an electric connector 24 (shown in FIGS. 6 and 7) to electrically connect the coil 14 to the electronic control unit (not shown) and an assembly flange 25, which laterally protrudes outside the tubular valve body 5 and displays a pair of through bores 26 through which assembly screws (not shown) of the electromagnetic valve 1 are arranged. According to a preferred embodiment, the closing body 23 is made in moulded plastic material and incorporates the magnetic washer 20 (which is welded to the assembly flange 25) therein and the coil 14 together with its ratchet 15; in other terms, the coil 14 together with its ratchet 15, the magnetic washer 20, the assembly flange 25 and the metal contacts of the electric connector 24 are moulded together during the manufacturing of the closing body 23.

According to a preferred embodiment, an external cylindrical surface of the keeper 17 and an upper annular surface of the keeper 17 are covered by a chromium layer; it must be noted that chromium is an amagnetic metal and displays a low friction coefficient to sliding (less than half with respect to steel). The function of the chromium layer on the upper annular surface of the keeper 17 is to avoid the magnetic adhesion of the keeper 17 to the magnetic pole 16 by always maintaining a minimum air gap between the keeper 17 and the magnetic pole 16. The function of the chromium layer on the outer cylindrical surface of the keeper 17 is both to facilitate the sliding of the keeper 17 with respect to the tubular valve body 5, and to make the side air gap uniform (by always maintaining a minimum air gap between the keeper 17 and the annular body 5) so as to avoid side magnetic adhesions and balance the radial magnetic forces.

According to a preferred embodiment, the obturator 9 displays a number of through bores 26, which are arranged between the inner ring 10 and the outer ring 11 and mainly serve to avoid pumping phenomena of the fuel during the displacements of the obturator 9. Furthermore, the bores 26 allow a certain flow of fuel within the central through opening 21 of the keeper 17 and the housing cavity 22 obtained in the magnetic pole 16 so as to allow an adequate washing of the whole keeper 17. In this connection, it must be noted that the presence of the outer ring 11 implies a small load loss localised during the flow of the fuel towards the outlet opening 4 and such a small localised load loss promotes a small fuel flow even along the side surface of the keeper 17 and through the bores 27 to improve the washing of the keeper 17.

According to a preferred embodiment the obturator 9 is made of elastic steel and displays a reduced thickness so as to be able to elastically deform at the centre; in this connection, it must be noted that the obturator 9 is welded to the keeper 17 only at its outer edge and therefore it may elastically deform at its centre. Such an elastic deformability of the obturator 9 allows to recover possible clearances or construction tolerances without impairing the optimal sealing of the obturator 9 itself. Furthermore, when the obturator 9 shifts from the open position to the closed position, the spring 12 pushes the obturator 9 against the lower disk 8 until the obturator 9 itself is induced to impact against the lower disk 8; in virtue of the central flexibility of the obturator 9, the impact of the obturator 9 against the lower disk 8 is absorbed by the outer ring 11 and is not absorbed by the inner ring 10 which needs to display a high planarity to guarantee an optimal sealing. In other terms, at the time of the impact of the obturator 9 against the lower disk 8, the obturator 9 elastically deforms at the centre thus determining a slight rise of the inner ring 10 which thus does not need to absorb the energy developed by the impact.

Two elastic material annular gaskets 28 are arranged around the tubular valve body 5, the gaskets being maintained in position by a plastic material annular spacer. Furthermore, a further plastic material annular spacer 30 (which is in any case optional) is interposed between an upper annular gasket 28 and the tubular magnetic armature 18. According to a preferred embodiment, the annular spacer 29 also serves as a filter to filter the fuel flowing through the radial openings 7; specifically, a side surface of the annular spacer 29 is formed by a meshed net.

Figure 2:
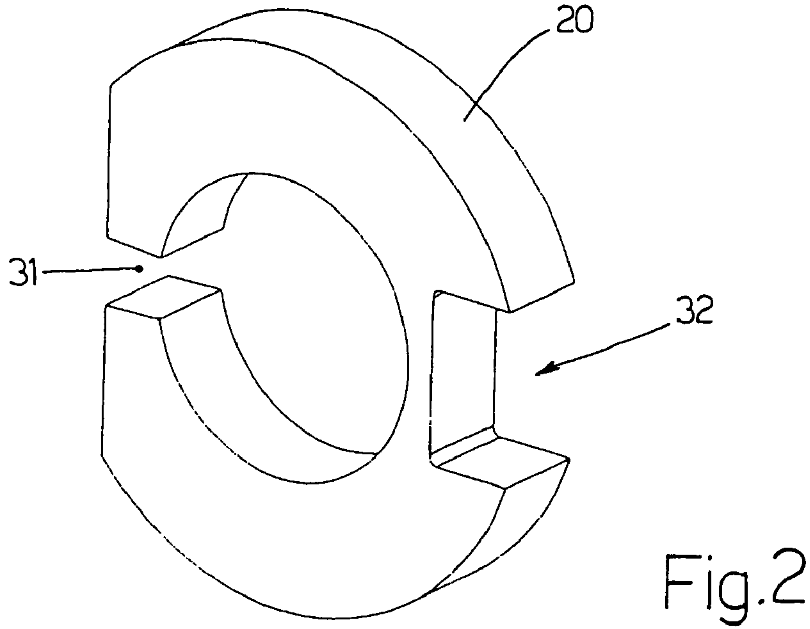
FIG. 2 is a perspective view of a magnetic washer of the electromagnetic valve in FIG. 1.
Figure 4:
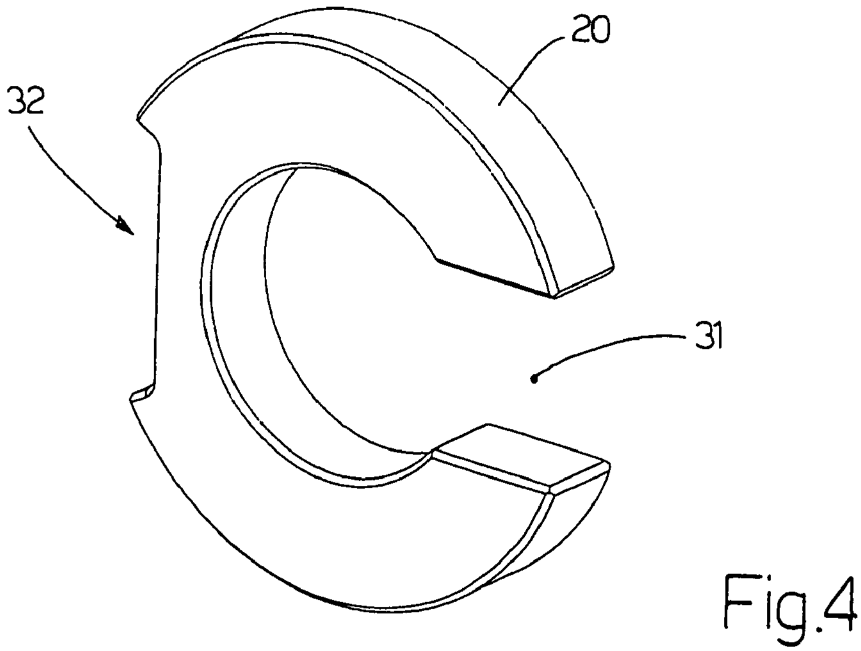
FIG. 4 is a perspective view of a constructive variant of the magnetic washer in FIG. 2.
Figure 5:
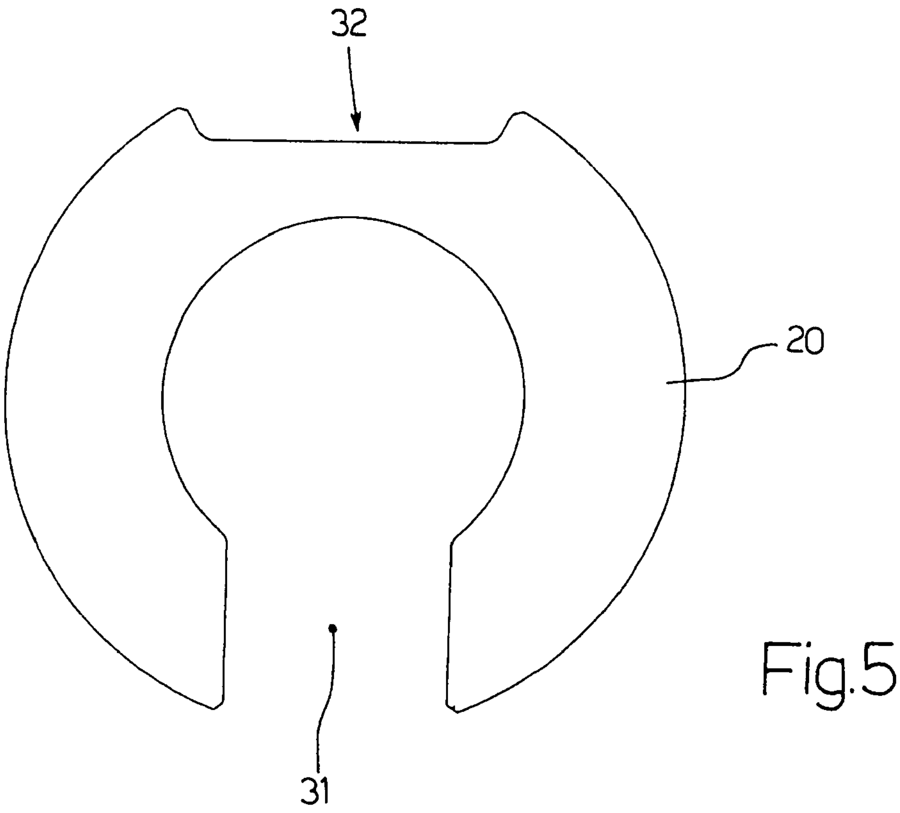
FIG. 5 is a plan view of the magnetic washer in FIG. 4.
Figure 3:
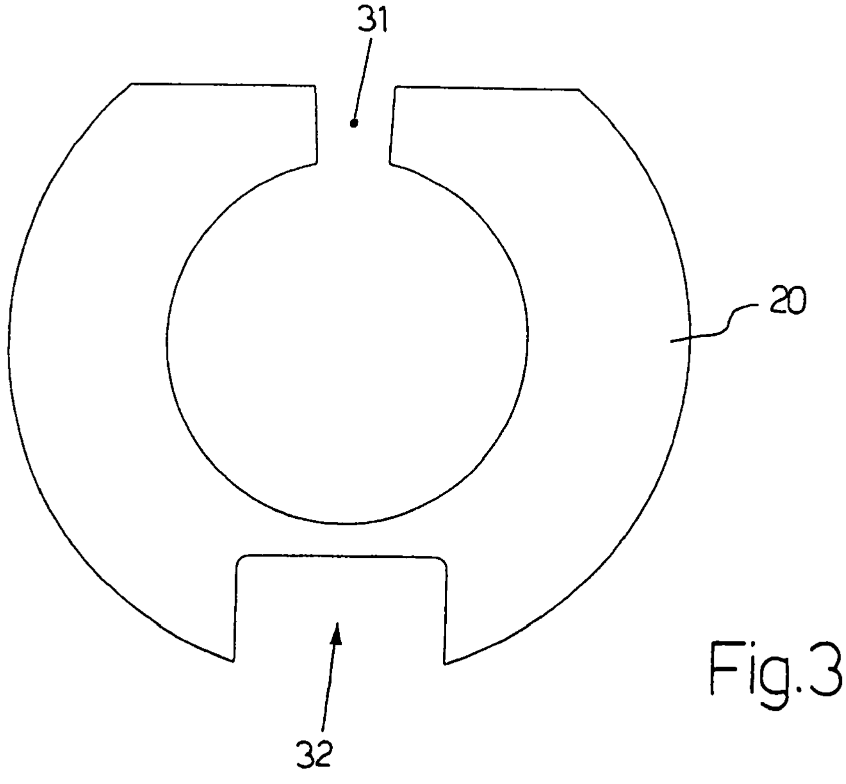
FIG. 3 is a plan view of the magnetic washer in FIG. 2.

According to what is shown in FIG. 2, the magnetic washer 20 displays a radial through slot 31 so as to be able to deform radially. According to the embodiment shown in FIGS. 2-5, beyond the radial slot 31 the magnetic washer 20 also displays a notch 32 through which the terminals of the coil 14 pass; alternatively, the magnetic washer 20 may not have the notch 32 and the terminals of the coil 14 are passed through the radial slot 31.

The tubular magnetic armature 18 is locked to the magnetic washer 20 by means of an interference driving that determines a radial deformation of the magnetic washer 20; the magnetic washer 20 is also locked to the tubular valve body 5 by means of an interference driving that determines a radial deformation of the magnetic washer 20.

According to a preferred embodiment, the magnetic washer 20 initially displays an inner diameter greater than the outer diameter of the tubular valve body 5 and initially displays an outer diameter greater than the inner diameter of the tubular valve armature 18; during assembly, the magnetic washer 20 is arranged around the tubular valve body 5 and the tubular magnetic armature 18 is thrust by force around the magnetic washer 20 so that the magnetic washer 20 deforms radially, thus tightening. In this manner, both the locking of the magnetic washer 20 to the tubular valve body 5, and the locking of the magnetic washer 20 of the magnetic armature 18 are obtained at the same time.

According to an alternative embodiment, the magnetic washer 20 initially displays an inner diameter smaller than the outer diameter of the tubular valve body 5 and initially displays an outer diameter smaller than the inner diameter of the tubular magnetic armature 18; during assembly the magnetic washer 20 is arranged within the tubular magnetic armature 18 and is thrust by force around the tubular valve body 5 so that the magnetic washer 20 deforms radially, thus widening. Also in this manner, both the locking of the magnetic washer 20 to the tubular valve body 5, and the locking of the magnetic washer 20 of the magnetic armature 18 are obtained at the same time.

In other terms, the assembly of the electromagnetic valve 1 provides that the garnets 28 separated by the spacer 29 are inserted around the tubular valve body 5, that spacer 30 is inserted around the tubular valve body 5 and thus that the magnetic armature 18 is inserted around the tubular valve body 5. At this point the closing body 23 that is provided with the connector 24 and the flange 25 and incorporates therein the magnetic washer 20 and the coil 14 together with its ratchet 15, is inserted around the tubular valve body 5. Finally, holding the closing body 23 still by clamping the edges of the flange 25, the magnetic armature 18 is driven upwards by a determined stroke (for instance equivalent to 2 mm) so as to determine both the locking of the magnetic washer 20 to the tubular valve body 5, and the locking of the magnetic washer 20 to the magnetic armature 18. The magnetic washer 20 being welded to the flange 25 and incorporated in the closing body 23, the locking of the magnetic washer 20 of the magnetic armature 18 also determines the locking of the closing body 23 to the magnetic armature 18.

It must be noted that to make the insertion of the magnetic washer 20 within the magnetic armature 18 easier, the upper portion of the magnetic armature 18 itself displays a conical flare.

The above-described electromagnetic valve 1 displays many advantages, because it is easy and cost-effective to make and at the same time allows to perform the locking of the magnetic washer 20 to the tubular valve body 5 and the locking of the magnetic washer 20 to the magnetic armature 18 without inducing any undesired deformation to the tubular valve body 5. Such a result is obtained in virtue of the fact that the interference driving determines a deformation of the magnetic armature 18 far from the mobile keeper 17 and in virtue of the fact that the interference driving is obtained by locking the flange 25 and thrusting on the magnetic armature 18 without therefore applying any axial stress to the tubular valve body 5.

Furthermore, in virtue of the fact that the magnetic washer 20 is clamped vicelike around the tubular valve body 5 and that the magnetic armature 18 is clamped vicelike around the magnetic washer 20, possible undesired air gaps between the magnetic washer 20 and the tubular valve body 5 and between the magnetic armature 18 and the magnetic washer 20 are completely eliminated.

It must be noted that the above-described constructive structure of the electromagnetic valve 1 may be applied without distinction both to an electromagnetic sliding valve of the flow rate of a fuel pump and to an electromagnetic fuel injector.

The invention claimed is:

1. An electromagnetic valve (1) for the dosage of fuel in an inner combustion engine; the electromagnetic valve (1) comprises:
- a cylindrical tubular valve body (5);
- an obturator (9), which is arranged within the tubular valve body (5) and is mobile between an open position and a closed position; and
- an electromagnetic actuator (13) to shift the obturator (9) and comprising a coil (14) arranged outside the tubular valve body (5), a fixed magnetic pole (16) is arranged within the tubular valve body (5), a mobile keeper (17) arranged within the tubular valve body (5) mechanically connected to the obturator (9) and is adapted to be magnetically attracted by the magnetic pole (16) when the coil (14) is excited, a tubular magnetic armature (18) arranged outside the tubular valve body (5) around the coil (14), and a magnetic washer (20) having an annular shape arranged above the coil (14) between the tubular valve body (5) and the tubular magnetic armature (18) to guide the closing of the magnetic flow around the coil (14);
- the electromagnetic valve (1) is characterised in that
- the magnetic washer (20) displays a radial through slot (31) so as to have the ability to deform radially; and
- the tubular magnetic armature (18) is locked to the magnetic washer (20) by means of an interference driving that determines a radial deformation of the magnetic washer (20).

2. An electromagnetic valve (1) according to claim 1, wherein the magnetic washer (20) is locked to the tubular valve body (5) by means of an interference driving that determines a radial deformation of the magnetic washer (20).

3. An electromagnetic valve (1) according to claim 2, wherein the magnetic washer (20) initially displays an inner diameter greater than the outer diameter of the tubular valve body (5) and initially displays an outer diameter greater than the inner diameter of the tubular valve armature (18); during assembly, the magnetic washer (20) is arranged around the tubular valve body (5) and the tubular magnetic armature (18) is thrust by force around the magnetic washer (20) so that the magnetic washer (20) deforms radially, thus tightening.

4. An electromagnetic valve (1) according to claim 2, wherein the magnetic washer (20) initially displays an inner diameter smaller than the outer diameter of the tubular valve body (5) and initially displays an outer diameter smaller than the inner diameter of the tubular valve armature (18); during assembly, the magnetic washer (20) is arranged within the tubular magnetic armature (18) and is thrust by force around the tubular valve body (5) so that the magnetic washer (20) deforms radially, thus widening.

5. An electromagnetic valve (1) according to claim 1 and comprising a closing body (23), which is arranged in contact with the magnetic armature (18) and supports an electric connector (24) of the coil (14) and an assembly flange (25).

6. An electromagnetic valve (1) according to claim 5, wherein the closing body (23) is made of moulded plastic material and incorporates the magnetic washer (20) and the coil (14) therein.

7. An electromagnetic valve (1) according to claim 6, wherein the assembly flange (25) is welded to the magnetic washer (20).

8. An electromagnetic valve (1) according to claim 1, wherein the valve body (5) is closed at the top, display a cylindrical seat (6) which serves in its lower portion as a fuel conduit, and comprises a number of radial through bores (7) to allow the entry of the fuel within the cylindrical seat (6); a lower disk (8) is provided, which is arranged within the cylindrical tubular valve body (5) below the radial bores (7) and displays a central through bore that defines an outlet opening (4) for the fuel; the obturator (9) displays a cylindrical shape, is coupled to the lower disk (8) and is mobile between the opening position, in which the outlet opening (4) is in communication with the radial bores (7), and the closed position, in which the outlet opening (4) is isolated from the radial bores (7).

9. An electromagnetic valve (1) according to claim 8, wherein from a lower surface of the cylindrical obturator (9) arranged facing the closing disk (8) an inner ring (10) protrudingly rises, which has a slightly greater diameter than the outlet opening (4) and defines a sealing element to isolate the outlet opening (4) from the radial bores (7) when the obturator (9) is arranged in the closed position resting against the lower disk (8).

10. An electromagnetic valve (1) according to claim 9, wherein from a lower surface of the cylindrical obturator (9) arranged facing the closing disk (8) an outer ring (11) protrudingly rises, which is arranged at the outer edge of the cylindrical obturator (9).

11. An electromagnetic valve (1) according to claim 10, wherein the obturator (9) displays a number of through bores (27), which are arranged between the inner ring (10) and the outer ring (11).

12. An electromagnetic valve (1) according to claim 8 and comprising a spring (12), which is compressed between an upper surface of the obturator (9) and an upper wall of the tubular valve body (5) to maintain the obturator (9) in the closed position resting against the lower disk (8).

13. An electromagnetic valve (1) according to claim 1, wherein an upper annular surface of the keeper (17) is covered by a layer of chromium.

14. An electromagnetic valve (1) according to claim 1, wherein an outer cylindrical surface (26) of the keeper (17) is covered by a chromium layer (28).

15. An assembly method for an electromagnetic valve (1) for the fuel dosage in an internal combustion engine; the electromagnetic valve (1) comprises:

a cylindrical tubular valve body (5);

an obturator (9), which is arranged within the tubular valve body (5) and is mobile between an open position and a closed position; and an electromagnetic actuator (13) to shift the obturator (9) and comprising a coil (14) arranged outside the tubular valve body (5), a fixed magnetic pole (16) is arranged within the tubular valve body (5), a mobile keeper (17) arranged within the tubular valve body (5) mechanically connected to the obturator (9) and is adapted to be magnetically attracted by the magnetic pole (16) when the coil (14) is excited, a tubular magnetic armature (18) arranged outside the tubular valve body (5) around the coil (14), and a magnetic washer (20) having an annular shape arranged above the coil (14) between the tubular valve body (5) and the tubular magnetic armature (18) to guide the closing of the magnetic flow around the coil (14);

the assembly method comprises the steps of:

obtaining on the magnetic washer (20) a radial through slot (31) so as to give the magnetic washer (20) the ability to deform radially;

locking the tubular magnetic armature (18) to the magnetic washer (20) by means of an interference driving that determines a radial deformation of the magnetic washer (20).

16. A method according to claim 15 and comprising the further step of locking the magnetic washer (20) to the tubular valve body (5) by means of an interference driving that determines a radial deformation of the magnetic washer (20).

17. A method according to claim 16, wherein the magnetic washer (20) initially displays an inner diameter greater than the outer diameter of the tubular valve body (5) and initially displays an outer diameter greater than the inner diameter of the tubular magnetic armature (18); during assembly, the magnetic washer (20) is arranged around the tubular valve body (5) and the tubular magnetic armature (18) is thrust by force around the magnetic washer (20) so that the magnetic washer (20) deforms radially, thus tightening.

18. A method according to claim 16, wherein the magnetic washer (20) initially displays an inner diameter smaller than the outer diameter of the tubular valve body (5) and initially displays an outer diameter smaller than the inner diameter of the tubular magnetic armature 18; during assembly, the magnetic washer (20) is arranged within the tubular magnetic armature (18) and is thrust by force around the tubular valve body (5) so that the magnetic washer (20) deforms radially, thus widening.

* * * * *